US012592429B2

(12) United States Patent
Bartling et al.

(10) Patent No.: US 12,592,429 B2
(45) Date of Patent: Mar. 31, 2026

(54) HEAT EXCHANGER AND BATTERY SYSTEM INCLUDING SAME

(71) Applicant: 3M INNOVATIVE PROPERTIES COMPANY, St. Paul, MN (US)

(72) Inventors: Brandon A. Bartling, Woodbury, MN (US); Raymond P. Johnston, Lake Elmo, MN (US); Ryan D. Lovik, New Brighton, MN (US); Ronald W. Ausen, St. Paul, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 891 days.

(21) Appl. No.: 17/634,344

(22) PCT Filed: Sep. 3, 2020

(86) PCT No.: PCT/IB2020/058219
§ 371 (c)(1),
(2) Date: Feb. 10, 2022

(87) PCT Pub. No.: WO2021/044345
PCT Pub. Date: Mar. 11, 2021

(65) Prior Publication Data
US 2022/0285757 A1 Sep. 8, 2022

Related U.S. Application Data

(60) Provisional application No. 62/896,750, filed on Sep. 6, 2019.

(51) Int. Cl.
H01M 10/65 (2014.01)
H01M 10/6551 (2014.01)
(Continued)

(52) U.S. Cl.
CPC ... H01M 10/6556 (2015.04); H01M 10/6551 (2015.04); H01M 10/6567 (2015.04)

(58) Field of Classification Search
None
See application file for complete search history.

(56) References Cited

U.S. PATENT DOCUMENTS 6,822,018 B2 11/2004 Chaudhuri
8,263,250 B2 9/2012 Hermann
(Continued)

FOREIGN PATENT DOCUMENTS

CN 103094639 5/2013
CN 208127381 U 11/2018
(Continued)

OTHER PUBLICATIONS

International Search Report for PCT International Application No. PCT/IB2020/058219, mailed on Dec. 9, 2020, 3 pages.

*Primary Examiner* — Barbara L Gilliam
*Assistant Examiner* — Angela J Martin
(74) *Attorney, Agent, or Firm* — Clifton F. Richardson

(57) ABSTRACT

A battery system includes a plurality of battery cells and a heat exchanger including a plurality of channels for transporting fluid. The channels extend generally along a first direction and are arranged along an orthogonal second direction. Each channel in the plurality of channels has a major surface disposed to contact the fluid. An integrally formed polymeric sheet extending along the first and second directions includes at least a portion of the major surface of each channel in the plurality of channels. A major surface of the heat exchanger is in thermal contact with a major surface of the plurality of battery cells.

17 Claims, 5 Drawing Sheets

(51) Int. Cl.
  *H01M 10/6556*        (2014.01)
  *H01M 10/6567*        (2014.01)

(56)              References Cited

U.S. PATENT DOCUMENTS

| | | | | |
|---|---|---|---|---|
| 8,733,465 | B1 * | 5/2014 | Flood | H01M 50/213 |
| | | | | 169/56 |
| 8,758,924 | B2 | 6/2014 | Tennessen | |
| 9,196,939 | B2 | 11/2015 | Christian | |
| 2003/0094264 | A1 | 5/2003 | Bergevin | |
| 2003/0157342 | A1 | 8/2003 | Myers | |
| 2003/0158294 | A1 | 8/2003 | Chaudhuri | |
| 2005/0039885 | A1 | 2/2005 | Vaidyanathan | |
| 2005/0287352 | A1 | 12/2005 | Myers | |
| 2009/0023056 | A1 | 1/2009 | Adams | |
| 2009/0136845 | A1 | 5/2009 | Choi | |
| 2010/0055547 | A1 | 3/2010 | Nakamura | |
| 2010/0136391 | A1 | 6/2010 | Prilutsky | |
| 2011/0111269 | A1 | 5/2011 | Tse | |
| 2011/0212354 | A1 * | 9/2011 | Nakamura | B60L 58/26 |
| | | | | 429/120 |
| 2011/0300428 | A1 | 12/2011 | Sohr | |
| 2012/0261819 | A1 | 10/2012 | Brunschwiler | |
| 2013/0171493 | A1 | 7/2013 | Wayne | |
| 2014/0234726 | A1 | 8/2014 | Christensen | |
| 2015/0136361 | A1 | 5/2015 | Gregory | |
| 2016/0056516 | A1 | 2/2016 | Srinivasan | |
| 2016/0362824 | A1 | 12/2016 | Ausen | |
| 2017/0081573 | A1 | 3/2017 | Kipke | |
| 2017/0194679 | A1 | 7/2017 | Chakraborty | |
| 2018/0026296 | A1 | 1/2018 | Kruger | |
| 2018/0097217 | A1 | 4/2018 | Danko | |
| 2018/0123197 | A1 | 5/2018 | Liptak | |
| 2018/0159105 | A1 | 6/2018 | Iriyama | |
| 2018/0205045 | A1 | 7/2018 | Schröder | |

FOREIGN PATENT DOCUMENTS

| | | |
|---|---|---|
| WO | WO 2002-009212 | 1/2002 |
| WO | WO 2013-101737 | 7/2013 |
| WO | WO 2020-094365 | 5/2020 |
| WO | WO 2021-028798 | 2/2021 |

* cited by examiner

HEAT EXCHANGER AND BATTERY SYSTEM INCLUDING SAME

CROSS REFERENCE TO RELATED APPLICATIONS

This application is a national stage filing under 35 U.S.C. 371 of PCT/IB2020/058219, filed Sep. 3, 2020, which claims the benefit of Provisional Application No. 62/896,750, filed Sep. 6, 2019, the disclosures of which are incorporated by reference in their entirety herein.

BACKGROUND

A battery pack can include a plurality of battery cells and a liquid cooling system that utilizes a heat exchanger.

Some rechargeable batteries can experience thermal runaway resulting in overheating and sometimes explosion of the battery.

SUMMARY

In some aspects of the present description, a battery system including a plurality of battery cells and a heat exchanger is provided. The heat exchanger includes a plurality of channels for transporting fluid. The channels extend generally along a first direction and are arranged along an orthogonal second direction. Each channel in the plurality of channels has a major surface disposed to contact the fluid. An integrally formed polymeric sheet extending along the first and second directions includes at least a portion of the major surface of each channel in the plurality of channels. A major surface of the heat exchanger is in thermal contact with a major surface of the plurality of battery cells.

In some aspects of the present description, a battery system including at least one battery cell and a heat exchanger is provided. The heat exchanger includes a plurality of channels extending generally along a first direction and arranged along an orthogonal second direction. A polymeric sheet extending along the first and second directions includes at least a portion of a major surface of the plurality of channels. A major surface of the heat exchanger is in thermal contact with a major surface of the at least one battery cell. The battery system provides fluid flow through the plurality of channels such that a temperature of a first battery cell in the at least one battery cell increasing above a predetermined temperature results in a rupturing of the plurality of channels. The rupturing of the plurality of channels increasing a rate of heat extraction from the first battery cell.

In some aspects of the present description, a heat exchanger including a plurality of channels for transporting fluid is provided. The channels extend generally along a first direction and are arranged along an orthogonal second direction. Each channel in the plurality of channels has a major surface disposed to contact the fluid. A polymeric sheet extending along the first and second directions includes at least a portion of the major surface of each channel in the plurality of channels. The polymeric sheet includes at least one feature such that the plurality of channels is configured to rupture at, or proximate to, the at least one feature upon the heat exchanger satisfying a predetermined condition.

DETAILED DESCRIPTION

Figures 1A, 1B, 1C, 2:
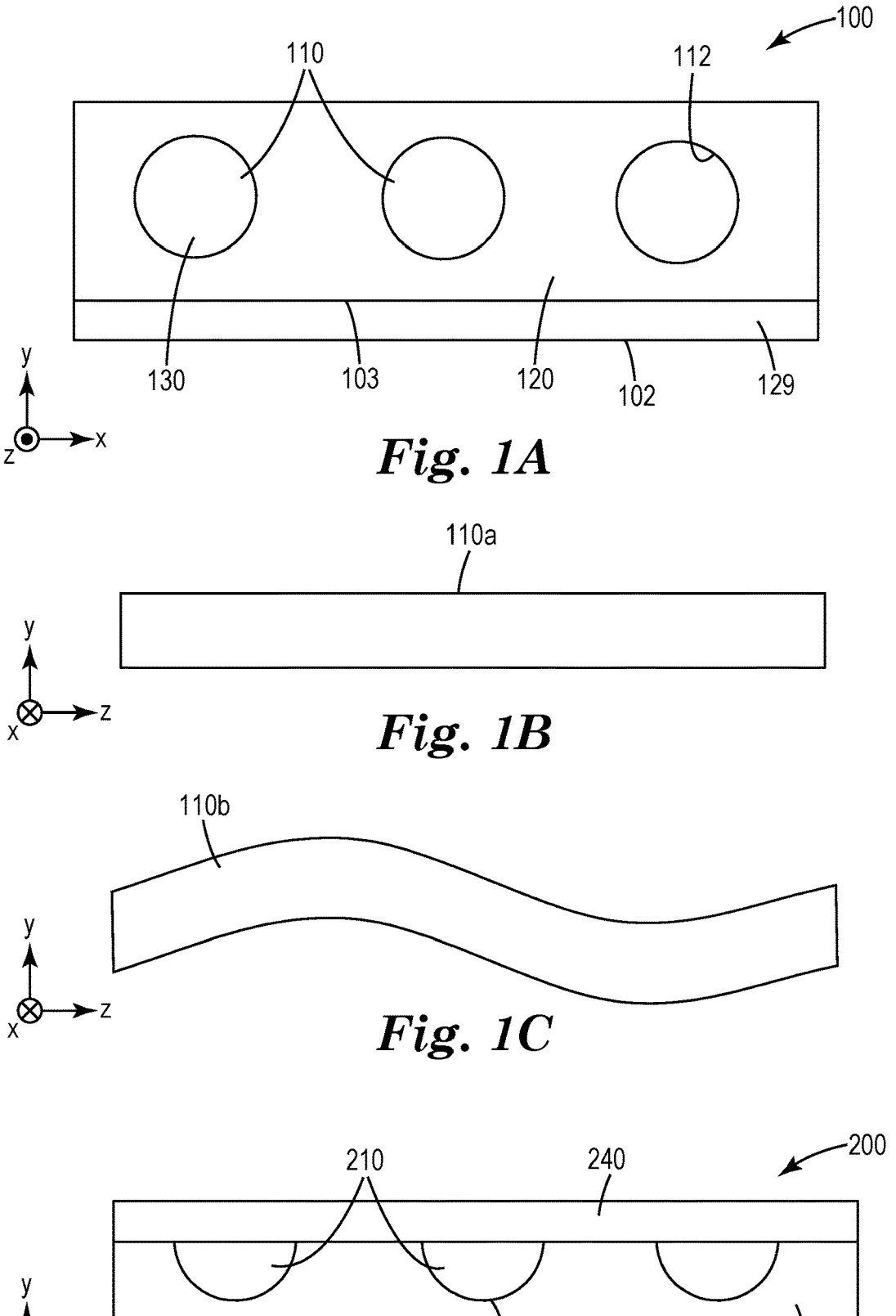
FIG. 1A is a schematic cross-sectional view of a heat exchanger including a plurality of channels.
FIGS. 1B-1C are schematic cross-sectional views of channels according to some embodiments.
FIGS. 2-3 are schematic cross-sectional views of heat exchangers.

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

In some embodiments, a heat exchanger of the present description is polymeric and includes a plurality of channels for transporting a fluid for cooling battery cell(s), for example. It has been found that such polymeric heat exchangers can be easily and inexpensively manufactured (compared to conventional heat exchangers) and that polymeric materials can provide the desired thermal conduction between the battery cell(s) and the fluid. In addition, the heat exchanger is electrically insulative in some embodiments and this allows the elimination of additional electrically insulative dielectric layers that are conventionally utilized in battery packs. The channels are typically closed channels (closed in lateral cross-sections such that fluid is confined in the channels). In some embodiments, the plurality of channels of the heat exchanger is configured to rupture upon the heat exchanger satisfying a predetermined condition (e.g., pressure and/or temperature exceeding a predetermined value as described elsewhere). The rupturing of the plurality of channels increases a rate of heat extraction from at least one of the battery cell(s). For example, if a thermal runaway is initiated in a battery cell, the increase in temperature of the battery cell can trigger the rupturing of the plurality of channels which allows more of the fluid to be directed to the battery cell thereby increasing the heat extraction from the battery cell which can prevent the thermal runaway from progressing. In some embodiments, the heat exchanger includes feature(s) which promote rupturing at predetermined locations adjacent the battery cell(s) to increase the heat extraction from the battery cell upon rupturing of the heat exchanger.

A battery may include a plurality of battery cells where each battery cell includes an anode, a cathode and a separator disposed therebetween. Such battery cells are known in the art and are described in U.S. Pat. Appl. Nos. 2009/0136845 (Choi et al.), 2014/0234726 (Christensen et al.), 2018/0097217 (Danko), and 2018/0159105 (Iriyama et al.), for example. A battery cell may be disposed in a casing or housing. The battery cell may have any suitable geometry and may be a cylindrical cell, a button cell, a prismatic cell, or a pouch cell, for example. A battery may include a plurality of battery cells disposed in a battery housing. A heat exchanger may be used to extract heat away from the battery cells. In some embodiments, the battery cells are lithium ion battery cells. In other embodiments, other types of battery cells may be used. In some embodiments, an automotive battery pack (e.g., a lithium ion battery pack) includes the battery cells. In other embodiment, the battery system may be used in non-automotive applications.

In some embodiments, a major surface of the heat exchanger is in thermal contact with a major surface of a battery cell or of a plurality of battery cells. In some embodiments, this major surface of the battery cell or the plurality of battery cells is or includes an outer major surface of a casing or housing of the battery cell. In some embodiments, this major surface of the battery cell or the plurality of battery cells is or includes a plurality of casings or housings of the plurality of battery cells. In some cases, a plurality of battery cells may be disposed in a common housing and the major surface of the plurality of battery cells may be an outer major surface of this common housing. A battery may include a plurality of these common housings in a battery housing, for example. A first surface is in thermal contact with a second surface when heat can be thermally conducted between the first and second surfaces. The first and second surfaces may be in direct physical contact or may be separated by one or more thermally conductive layers (e.g., a thermal interface material), for example. In some embodiments, the major surface of the battery cell or of the plurality of battery cells is disposed directly or indirectly (e.g., through a thermal interface material) on the major surface of the heat exchanger.

FIG. 1A is a schematic cross-sectional view of a heat exchanger 100 including a plurality of channels 110 extending generally along a first direction (z-direction) and arranged along an orthogonal second direction (x-direction). In some embodiments, the plurality of channels 110 is for transporting a fluid 130 (e.g., along a length (e.g., z-direction) of the channels). In some such embodiments, each channel in the plurality of channels 110 has a major surface 112 disposed to contact the fluid 130. The major surface of a channel faces an interior of the channel. In some embodiments, a polymeric sheet 120 extending along the first and second directions (z- and x-directions) includes at least a portion of a major surface 112 of the plurality of channels 110. For example, the polymeric sheet 120 may include at least a portion of a major surface of at least one channel or, preferably, at least a portion of the major surface of each channel in the plurality of channels 110. In some embodiments, the polymeric sheet 120 includes at least a majority of a total area of the major surfaces 112 of the plurality of channels 110 (greater than 50 percent of the total combined area of the major surface of each channel in the plurality of channels 110). In the illustrated embodiment, an optional thermal interface material 129 is disposed on a major surface 103 of the polymeric sheet 120 where the thermal interface material 129 has an outer major surface 102. Thermal interface materials are described further elsewhere herein. In some embodiments, each channel in the plurality of channels 110 is a closed channel A closed channel is a channel having a closed boundary in each lateral cross-section along a length of the channel. In some embodiments, the channels 110 may include openings facing a battery cell which are sealed off when the heat exchanger is bonded to the battery cell. In some such embodiments, the adhesive layer bonding the heat exchanger to the battery cell together with the polymeric sheet define closed channels.

FIG. 1B is a schematic cross-sectional view of a channel 110a which may a channel in the plurality of channels 110 in some embodiments. FIG. 1C is a schematic cross-sectional view of a channel 110b which may a channel in the plurality of channels 110 in some embodiments. The channel 110a extends along the z-direction (which is a linear first direction) while the channel 110b extends generally along the z-direction but has a center axis, for example, that varies about the z-direction. Alternatively, channel 110b can be described as extending along a curvilinear direction along the axis of the channel. Similarly, the second direction can be a linear direction (e.g., x-direction) or a curvilinear direction (see, e.g., FIG. 10).

In some embodiments, plurality of channels 110 includes at least 2, 3, 5, 10, or 15 channels (e.g., 2 to 200 channels). In some embodiments, the heat exchanger 100 includes channels in addition to the plurality of channels 110. For example, each channel in the plurality of channels 110 may be adapted to transport a cooling fluid and other channels may be included in the heat exchanger 100 that are not used to transport the cooling fluid. As another example, in some embodiments, a heat exchanger may include a separate layer which provides additional channels that may be used for transporting a fluid, for example, but the plurality of channels 110 includes only those channels where the polymeric sheet 120 includes at least a portion of a major surface of the channel. In other embodiments, each channel for transporting fluid in the heat exchanger 100 is a channel in the plurality of channels 110.

In the illustrated embodiment, the polymeric sheet 120 includes all of the major surface 112 of each channel in the plurality of channels 110. In this case, the polymeric sheet 120 includes the plurality of channels 110. In other embodiments, the plurality of channels may be formed between the polymeric sheet 120 and an additional layer as schematically illustrated in FIG. 2.

FIG. 2 is a schematic cross-sectional view of a heat exchanger 200 including a plurality of channels 210 extending generally along a first direction (z-direction) and arranged along an orthogonal second direction (x-direction). A polymeric sheet 220 extending along the first and second directions (z- and x-directions) includes at least a portion of a major surface 212 of the plurality of channels 210 (e.g., a portion of a major surface of each channel in the plurality of channels 210). The plurality of channels 210 is formed between the polymeric sheet 220 and an additional layer 240.

In some embodiments, the additional layer 240 and the integrally formed polymeric sheet 220 have different compositions. For example, the polymeric sheet 220 may be formed from a first polymer and the additional layer 240 may be formed from a different second polymer or from another material such as a metal layer. In some embodiments, the additional layer 240 and the polymeric sheet 220 differ in a least one of thermal conductivity, melting point, or Young's modulus, for example. Using different materials for the polymeric sheet 220 and the additional layer 240 allows the material used for one of the sheet or additional layer to be selected to have desired thermal properties (e.g., high thermal conductivity) and the other of the sheet or layer to be selected to have desired mechanical properties (e.g., Young's modulus), for example. In some embodiments, polymeric sheet 220 is integrally formed. In some embodiments, the additional layer 240 is integrally formed with the integrally formed polymeric sheet 220 (e.g., the additional layer 240 and the polymeric sheet 220 can be formed by coextrusion).

The cross-sectional shapes of the channels may be any suitable shape such as circular, elliptical, rectangular, square, triangular, or hexagonal, for example.

Figures 3, 4A, 4B, 5A:
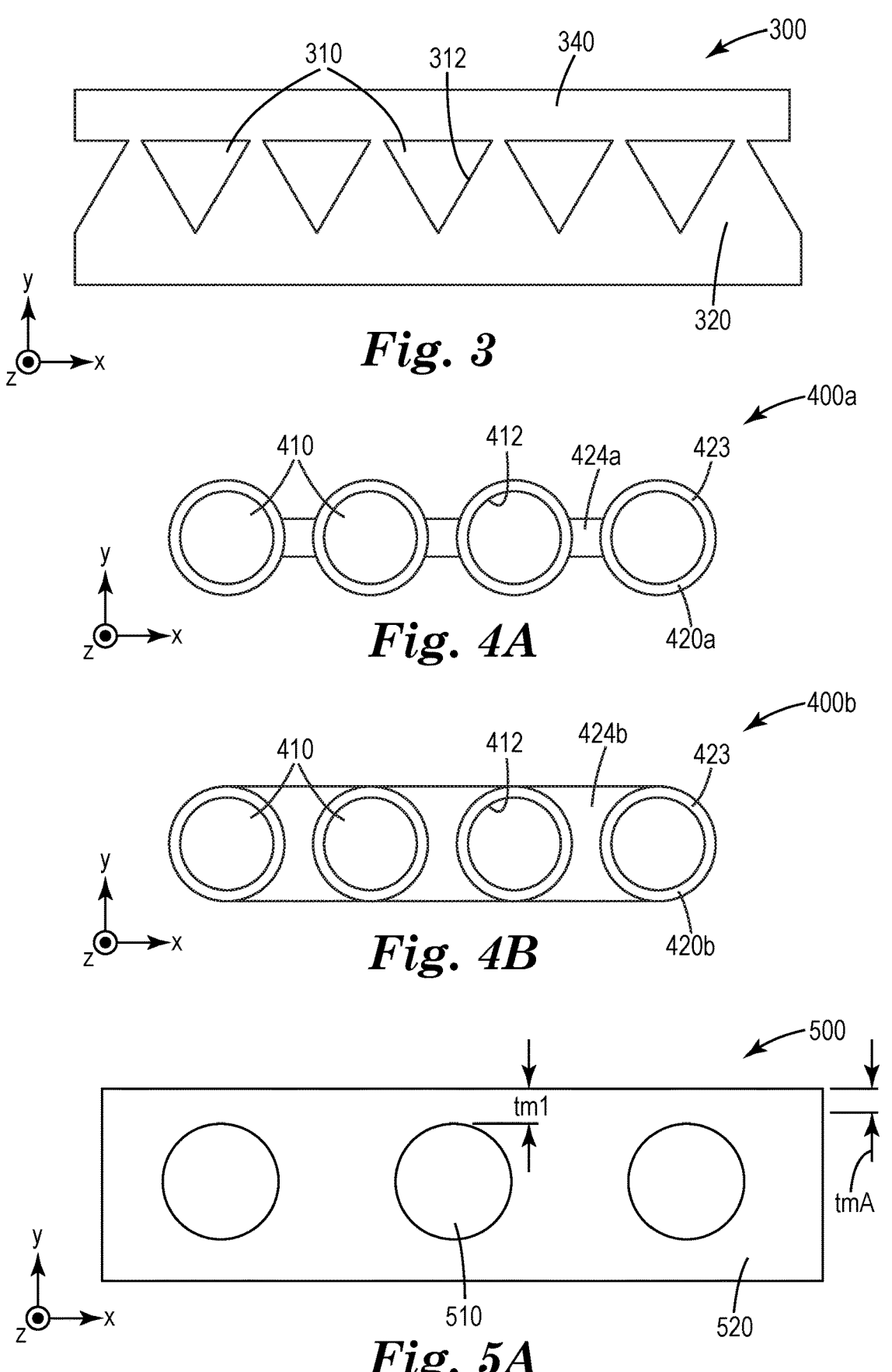
FIGS. 4A-4B are schematic cross-sectional views of heat exchangers including tube portions and intermediate portions.
FIGS. 5A-5B are schematic cross-sectional views of a heat exchanger in two different cross-sections.

FIG. 3 is a schematic cross-sectional view of a heat-exchanger 300 including a plurality of channels 310 formed between a polymeric sheet 320 and an additional layer 340. In the illustrated embodiment, the polymeric sheet 320 is a prism film and the additional layer 340 is used to form an upper boundary of triangular shaped channels. The polymeric sheet 320 extends along the first and second directions (z- and x-directions) and includes a portion of a major surface 312 of the plurality of channels 310.

FIGS. 4A-4B are schematic cross-sectional views of heat exchangers 400a and 400b, respectively, each of which include a plurality of channels 410 extending generally along a first direction (z-direction) and arranged along an orthogonal second direction (x-direction). A polymeric sheet 420a or 402b extending along the first and second directions (z- and x-directions) includes a major surface 412 of each channel in the plurality of channels 410 in the illustrated embodiments. The polymeric sheet 420a or 420b may be an integrally formed polymeric sheet made by coextruding tube portions 423 and intermediate portions 424a or 424b, respectively. In some embodiments, the integrally formed polymeric sheet 420a, 420b includes a plurality of tube portions 423 joined together through intermediate portions 424a, 424b where each tube portion 423 includes a channel in the plurality of channels 410. In some embodiments, the tube portions 423 and the intermediate portions 424a, 424b have different compositions. In some embodiments, the tube portions 423 and the intermediate portions 424a, 424b have a same composition. For example, the tube portions 423 and intermediate portions 424a, 424b can be made from a same polymer or from different polymers. Coextrusion techniques that can be used to make heat exchanger 400a or 400b are generally described in U.S. Pat. Appl. Pub. No. 2016/0362824 (Ausen et al.), for example. Each of the intermediate portions 424a or 424b may be an oscillating polymeric strand that is intermittently joined to adjacent tube portions 423 as generally described in U.S. Pat. Appl. Pub. No. 2016/0362824 (Ausen et al.), for example.

In some embodiments, the intermediate portions are formed from a thermal interface material. For example, the intermediate portions 424b can be a thermal interface material such that the intermediate portions 424b effectively conduct heat between an adjacent battery cell, for example, and the tube portions 423.

In some embodiments, the geometry of a heat exchanger provides additional surface area for bonding (e.g., using a thermal interface adhesive), for example. In some embodiments, a thermal interface material (e.g., a thermal interface adhesive) having a higher thermal conductivity than that of the polymeric material of the polymeric sheet 420a or 420b, or higher than that of the tube portions 423, is disposed on an outer major surface of the polymeric sheet for bonding the polymeric sheet to battery cell(s). For example, the geometry of the heat exchanger 400a can provide an increased fraction of the outer major surface where the added thermal interface material is within a specified distance (e.g., a distance of about 1.2 times average minimum wall thickness of the plurality of channels) of the fluid in the channels 110.

Thermally conductive particles may be included in a sheet or layer to increase the thermal conductivity of the sheet or layer. In some embodiments, an integrally formed polymeric sheet includes a plurality of thermally conductive particles dispersed in a polymer. For example, in some embodiments, the tube portions 423 include a plurality of thermally conductive particles dispersed in a polymer. In some embodiments, at least one of an additional layer (e.g., additional layer 240) and an integrally formed polymeric sheet (e.g., polymeric sheet 220) of a heat exchanger includes a plurality of thermally conductive particles dispersed in a polymer. In some embodiments, one, but not the other, of the additional layer and the integrally formed polymeric sheet includes a plurality of thermally conductive particles dispersed in a polymer. In some embodiments, the thermally conductive particles include one or more of metallic particles, silver particles, copper particles, diamond particles, boron nitride particles, silicon nitride particles, alumina particles, silicon carbide particles, and silica particles. If metallic particles are used, the particles may include a dielectric coating to ensure that the polymeric material does not become electrically conductive. Suitable thermally conductive particles dispersed in a polymer are described in U.S. Pat. No. 6,822,018 (Chaudhuri et al.), for example.

In some embodiments, a heat exchanger is configured to rupture upon the heat exchanger satisfying a predetermined condition (e.g., pressure and/or temperature exceeding a predetermined value as described elsewhere). In some embodiments, the heat exchanger includes feature(s) which promote rupturing at preferred predetermined locations. In other embodiments, the heat exchanger ruptures adjacent where a battery cell exceeds a predetermined temperature, for example, and such features(s) are not included.

Figure 5B:
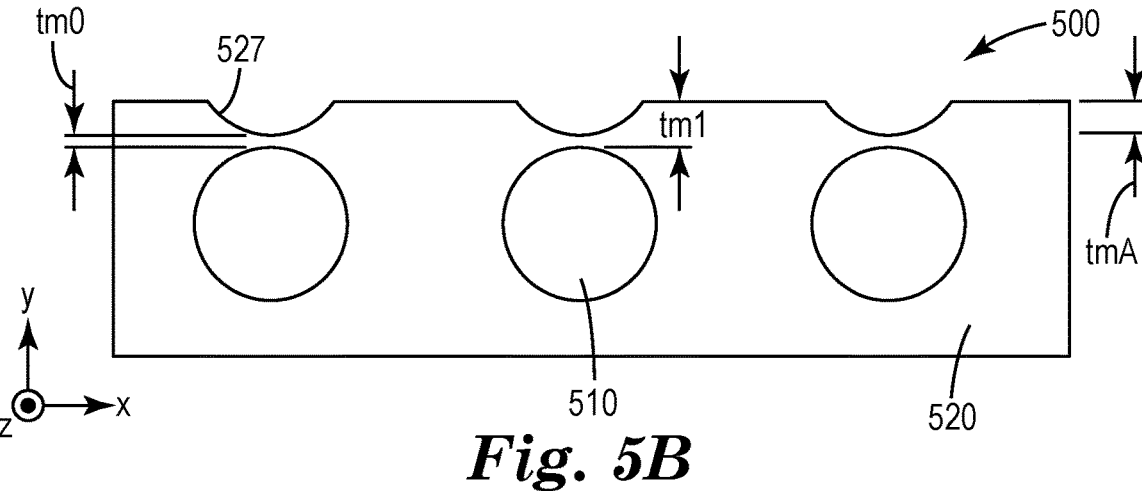

FIGS. 5A-5B are cross-sectional views of a heat exchanger 500 in two different cross-sections along a length of the heat exchanger 500. The heat exchanger 500 includes a polymeric sheet 520 including at least a portion of the major surface (all of the major surface in the illustrated embodiment) of each channel in a plurality of channels 510. The polymeric sheet 520 includes at least one feature 527 such that the plurality of channels 510 is configured to rupture at, or proximate to, the at least one feature 527 upon the heat exchanger satisfying a predetermined condition. The at least one feature 527 can be placed in the heat exchanger so that a feature is proximate a battery cell. This can promote rupturing proximate the battery cell when the predetermined condition is satisfied.

In some embodiments, the at least one feature 527 includes at least one indentation in a sidewall of the plurality of channels. In some embodiments, the at least one feature 527 includes at least one region where a minimum wall thickness of the plurality of channels 510 is tm0 as illustrated in FIG. 5B, and the heat exchanger has at least one region away from the at least one feature 527 where the minimum wall thickness is tm1 as illustrated in FIG. 5A. An average minimum wall thickness tmA of the plurality of channels 510 is the average (over the channels and over the length of the channels) of the minimum wall thickness. In some embodiments, the at least one feature 527 includes at least one region where a minimum wall thickness tm0 of the plurality of channels 510 is less than an average minimum wall thickness tmA of the plurality of channels 510.

Figure 6:
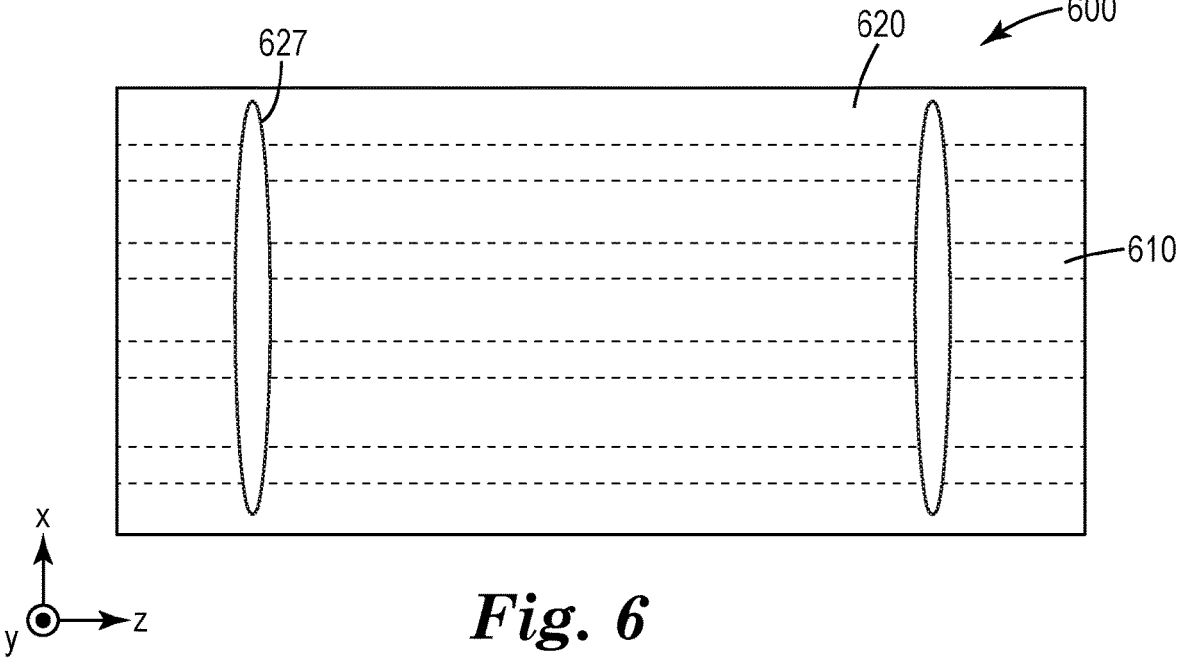
FIG. 6 is a schematic top view of a heat exchanger.

In some embodiments, the at least one feature 527 incudes at least one indentation in a sidewall of the plurality of channels 510. In some embodiments, a separate indentation is applied for each channel as schematically illustrate in FIG. 5B. In some embodiments, an indentation across the plurality of channels results in an indentation in the sidewalls of the plurality of channels. This is schematically illustrated in FIG. 6 which is a schematic top view of a heat exchanger 600 including a polymeric sheet 620 and a plurality of channels 610 as described elsewhere. The polymeric sheet 620 includes at least one feature 627 (two features in the illustrated embodiment) such that the plurality of channels 610 is configured to rupture at, or proximate to, the at least one feature 627 upon the heat exchanger 600 satisfying a predetermined condition. In the illustrated embodiment, each feature in the at least one feature 627 is an indentation across the plurality of channels 610.

The at least one feature can be formed with the polymeric sheet in a molding or extrusion process, for example, or can be formed by embossing after the polymeric sheet has been formed. The at least one feature may be a plurality of features arranged so that when the heat exchanger is disposed adjacent plurality of battery cells, at least one of the features in the plurality of features is disposed proximate each battery cell in the plurality of battery cells.

The polymeric sheet (e.g., 120, 220, 320, 420a, 420b, 520, or 620) may be an integrally formed polymeric sheet. As used herein, an "integrally formed" article means that the article is manufactured as a single piece rather than being manufactured as separate pieces that are then subsequently joined to form the article. For example, an integrally formed polymeric sheet may be an extruded sheet. The extruded sheet may have a unitary construction (formed as a single piece from a single composition), for example, or may have multiple elements having different compositions that are coextruded together to form a single piece as described in U.S. Pat. Appl. Pub. No. 2016/0362824 (Ausen et al.), for example. As another example, an integrally formed polymeric sheet may be a molded sheet. In some embodiments, the integrally formed polymeric sheet is a unitary sheet. In some embodiments, the integrally formed polymeric sheet is one or more of an extruded sheet, a molded sheet, or a unitary sheet (e.g., the polymeric sheet can be an extruded unitary sheet or a molded unitary sheet).

In some embodiments, the average minimum wall thickness (e.g., tmA depicted in FIGS. 5A-5B) of the plurality of channels is at least 0.005 mm or at least 0.01 mm or at least 0.03 mm, and no more than 1.5 mm, or no more than 1 mm, or no more than 0.5 mm, or no more than 0.3 mm. For example, in some embodiments, the average minimum wall thickness is in a range of 0.005 mm to 1 mm, or in a range of 0.01 mm to 0.5 mm, or in a range of 0.03 mm to 0.3 mm.

In some embodiments, an average largest lateral dimension of the plurality of channels (average over the channels of the largest lateral dimension (e.g., diameter) of the channel) is at least 0.1 mm or at least 0.2 mm or at least 0.3 mm, and no more than 10 mm or no more than 5 mm or no more than 3 mm. For example, in some embodiments, the average largest lateral dimension of the plurality of channels is in a range of 0.1 mm to 10 mm, or 0.2 mm to 5 mm, or 0.3 mm to 3 mm. In some embodiments, the plurality of channels has an average center to center spacing in a range of 1 to 2.5 times, or 1.1 to 2 times the average largest lateral dimension of the plurality of channels, for example.

In some embodiments, the heat exchanger is electrically insulative. For example, the heat exchanger may be formed from electrically insulative polymeric materials. In some embodiments, the heat exchanger is formed from electrically insulative polymeric materials having a volume resistivity of at least $10^{10}$ ohm cm or at least $10^{12}$ ohm cm, for example. In some embodiments, an electrical resistance across a thickness (e.g., y-direction) of the heat exchanger is at least $10^6$ ohms or at least $10^8$ ohms or at least $10^{10}$ ohms, for example. The resistance and resistivity refer to the zero frequency (direct current) resistance and resistivity, respectively, determined when the plurality of channels is empty (except for air), unless indicated differently.

In some embodiments, the heat exchanger is polymeric. A polymeric material is a material having a continuous phase of organic polymer. Inorganic materials, such as inorganic nanoparticles, may be dispersed in the organic polymer of a polymeric material. In some embodiments, the polymeric material of the heat exchanger includes thermally conductive particles to improve the thermal conductivity as described further elsewhere. A polymeric layer or sheet is a layer or sheet made of polymeric material. A polymeric heat exchanger is formed primarily of polymeric materials (e.g., the plurality of channels formed in or between polymeric layers). In some embodiments, a polymeric heat exchanger, not including any fluid in the channels, consists essentially (e.g., at least 98 or at least 99 percent by weight) of polymeric material.

The polymeric materials used in the heat exchanger may include thermoplastic polymers, thermoset polymers (e.g., thermoset epoxies), and radiation (e.g., ultraviolet or electron beam) cured polymers (e.g., acrylates or methacrylates), for example. Suitable thermoplastic polymers include polyolefins (e.g., polypropylene and polyethylene), polyvinyl chloride, polystyrene, nylons, polyesters (e.g., polyethylene terephthalate) and copolymers and blends thereof. Suitable polymeric materials also include elastomeric materials (e.g., ABA block copolymers, polyurethanes, polyolefin elastomers, polyurethane elastomers, metallocene polyolefin elastomers, polyamide elastomers, ethylene vinyl acetate elastomers, and polyester elastomers). Other useful materials include, for example, styrene-acrylonitrile, cellulose acetate butyrate, cellulose acetate propionate, cellulose triacetate, polyether sulfone, polymethyl methacrylate, polyurethane, polyester, polycarbonate, polyvinyl chloride, polystyrene, polyethylene naphthalate, copolymers or blends based on naphthalene dicarboxylic acids, polyolefins, polyimides, mixtures and/or combinations thereof. In some embodiments, the polymeric materials are melt-processable polymers. Useful polymers include polyethylene such as high-density polyethylene (HDPE), for example. In some embodiments, the polymers, copolymers, or blend of polymers are selected to have a desired softening point or melting point (e.g., close to a predetermined temperature for the rupturing of the plurality of channels).

Any of the heat exchangers described herein can include a thermal interface material (TIM) for improving thermal transport between battery cell(s) and the heat exchanger. For example, in some embodiments, the heat exchanger 100 includes the thermal interface material 129. In some embodiments, a battery system includes the heat exchanger 100 and a plurality of battery cells with a major surface 102 of the heat exchanger 100 contacting a major surface the plurality of cells. Alternatively, the thermal interface material 129 can be considered to be a separate layer disposed between a major surface 103 of the heat exchanger and a major surface of the plurality of battery cells. In this case, the major surface 103 may be in thermal contact, but not in direct physical contact, with the major surface of the plurality of battery cells. In some embodiments, the thermal interface material 129 is disposed between the polymeric sheet 120 and the plurality of battery cells. Any suitable TIM can be used. Useful TIMs are known in the art and include thermal grease, thermal adhesive, and thermal tape, for example.

Figures 7A, 7B, 8:
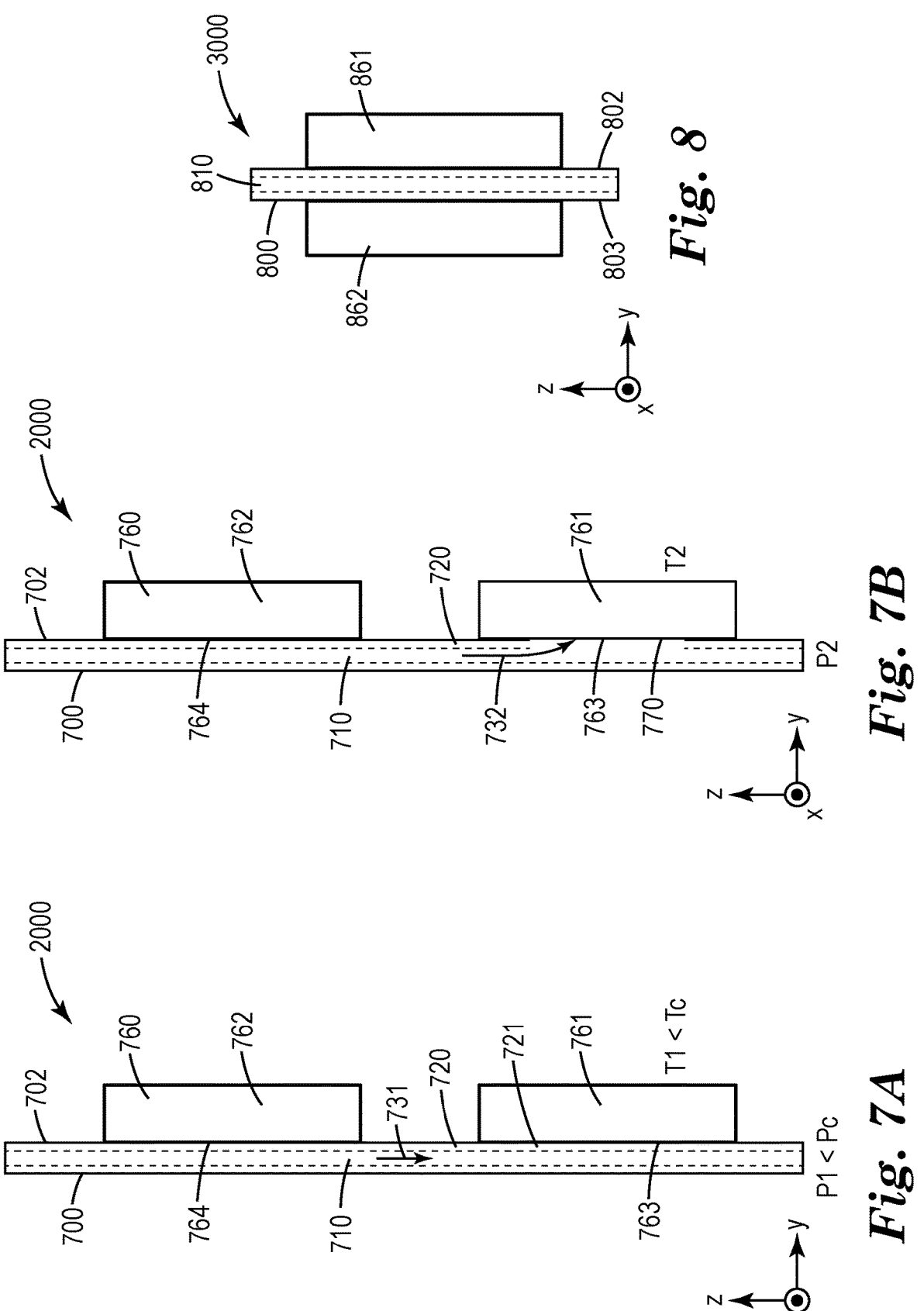
FIGS. 7A-7B are schematic side views of a portion of a battery system before and after a rupturing of a plurality of channels, respectively.
FIGS. 8-9 are schematic side views of portions of a battery system.

FIGS. 7A-7B are schematic side views of a portion of battery system 2000 before and after a rupturing of a plurality of channels, respectively. In some embodiments, the battery system 2000 includes a plurality of battery cells 760 and a heat exchanger 700 where a major surface 702 of the heat exchanger 700 is in thermal contact with a major surface (e.g., 763) of the plurality of battery cells 760. The plurality of battery cells 760 includes first and second battery cells 761 and 762. First battery cell 761 includes a major surface 763, and second battery cell 762 includes a major surface 764. In the illustrated embodiment, the major surface 702 contacts the major surfaces 763 and 764, each of which is a major surface of the plurality of battery cells 760. In some embodiments, a thermal interface material is disposed between the major surface 702 and the major surfaces 763 and 764.

The battery system 2000 may include additional elements not shown in the schematic illustrations of FIGS. 7A-7B. For example, the battery system 2000 may include a pump for pumping a cooling fluid (e.g., a mixture of ethylene glycol and water and optionally a corrosion inhibitor) and a manifold for distributing the cooling fluid to the plurality of channels. Various components of battery cooling systems are known in the art and are described, for example, in U.S. Pat. No. 8,263,250 (Hermann) and U.S. Pat. No. 8,758,924 (Tennessen et al.), and in U.S. Pat. Appl. Pub. Nos. 2018/0026296 (Kruger et al.) and 2018/0205045 (Schroder et al.).

The heat exchanger 700 may be any heat exchanger of the present description. For example, in some embodiments, the heat exchanger 700 includes a plurality of channels 710 for transporting fluid, the plurality of channels 710 extending generally along a first direction (z-direction) and arranged along an orthogonal second direction (x-direction), where each channel in the plurality of channels has a major surface (e.g., inner surface of the channel) disposed to contact the fluid, and where a polymeric sheet 720 (e.g., an integrally formed polymeric sheet) extending along the first and second directions includes at least a portion of the major surface of each channel in the plurality of channels 710. As another example, in some embodiments, the heat exchanger 700 includes a polymeric sheet 720 extending along the first and second directions and including at least a portion of the major surface of each channel in the plurality of channels 710, where the polymeric sheet 720 includes at least one feature (not illustrated in FIGS. 7A-7B; see, e.g., FIGS. 5B and 6) such that the plurality of channels is configured to rupture at, or proximate to, the at least one feature upon the heat exchanger satisfying a predetermined condition.

A ruptured region 770 is schematically illustrated in FIG. 7B. In some embodiments, a battery system 2000 includes a heat exchanger 700 and a battery cell 761 having a major surface 763 in thermal contact with a major surface 702 of the heat exchanger 700, where the battery system 2000 provides fluid flow 731 through the plurality of channels such that upon the heat exchanger satisfying the predetermined condition, the rupturing of the plurality of channels at, or proximate to, the at least one feature increases a rate of heat extraction from the battery cell 761. In some embodiments, the battery system 2000 includes the heat exchanger 700 and a plurality of battery cells 760, where a major surface of the heat exchanger 700 is in thermal contact with a major surface of the plurality of battery cells 760, and the battery system 2000 provides fluid flow 731 through the plurality of channels 710 such that upon the heat exchanger satisfying the predetermined condition at a location adjacent a first battery cell 761 in the plurality of battery cells 760, the rupturing of the plurality of channels 710 at, or proximate to, the at least one feature increases a rate of heat extraction from the first battery cell 761. For example, after rupturing at least a portion of the fluid flow in the channels 710 can be diverted to the first battery cell 761 as fluid flow 732 which increases a rate of heat extraction from the first battery cell 761.

In some embodiments, the predetermined condition includes a temperature of the polymeric sheet exceeding a predetermined temperature. In some embodiments, the temperature of the polymeric sheet is a local temperature at a location (e.g., adjacent a battery cell) in the polymeric sheet. In some embodiments, the predetermined temperature is in a range of 100° C. to 200° C. In some embodiments, the predetermined temperature is within 20° C. of a melting point of a separator between an anode and a cathode of a battery cell. In some embodiments, the predetermined condition includes a pressure in the plurality of channels exceeding a predetermined pressure. In some embodiments, a water-based solution is used as a cooling fluid in the plurality of channels and the normal operating pressure is then preferably above the water saturation curve for the operating temperature of the heat exchanger (e.g., to avoid cavitation during normal operation). In some such embodiments, the predetermined pressure is above the water saturation curve. For example, the predetermined pressure may be in a range of 1 bar to 100 bar.

The predetermined condition is not satisfied in FIG. 7A and has been satisfied in FIG. 7B. The temperature of the polymeric sheet adjacent the battery cell 761 is T1 in FIG. 7A and T2 in FIG. 7B. The pressure in the plurality of channels 710 adjacent the battery cell 761 is P1 in FIG. 7A and P2 in FIG. 7B. In some embodiments, on or both of T1 and P1 is different than T2 and P2, respectively. In some embodiments, the predetermined condition includes the conditions T>Tc and/or P>Pc (e.g., the predetermined condition may be: T>Tc; or may be: P>Pc; or may be: T>Tc or P>Pc; or may be: T>Tc and P>Pc), where T is temperature of the polymeric sheet adjacent a battery cell, Tc is a predetermined temperature, P is the pressure in the channels adjacent a battery cell, and Pc is a predetermined pressure. In some embodiments, T1<Tc and P1<Pc for the state of the battery system 2000 schematically illustrated in FIG. 7A, and at least one of the conditions T1>Tc and/or P1>Pc have been satisfied for the state of the battery system 2000 schematically illustrated in FIG. 7B.

In some embodiments, the predetermined pressure Pc is a predetermined function of the temperature T. For example, Pc may be lower for T close to Tc than for lower T. Similarly, in some embodiments, the predetermined temperature Tc is a predetermined function of the pressure P. For example, Tc may be lower for P close to Pc than for lower P. In some embodiments, the predetermined condition can be expressed as F(T/Tc, P/Pc)>1, where F is a predetermined function of its two arguments and where Tc and/or Pc may be predetermined functions of T and/or P.

In some embodiments, the battery system 2000 provides fluid flow through the plurality of channels such that a temperature of a first battery cell 761 in the plurality of battery cells 760 increasing above a predetermined temperature results in a rupturing of the plurality of channels, the rupturing of the plurality of channels increasing a rate of heat extraction from the first battery cell. In some embodiments, rupturing of the plurality of channels includes rupturing of the (e.g., integrally formed) polymeric sheet. In the embodiments schematically illustrated in FIGS. 2-3, the rupturing of plurality of channels may instead or in addition include rupturing the additional layer 240 or 340. In some embodiments, the polymeric sheet includes at least one feature disposed proximate the first battery cell such that the plurality of channels is configured to rupture at, or proximate to, the at least one feature upon the temperature of the first battery cell exceeding the predetermined temperature.

In some embodiments, at least a portion 721 of the polymeric sheet 720 (e.g., an integrally formed polymeric sheet) is disposed between the battery cell 761 and the plurality of channels 710. In some embodiments, at least a portion of the polymeric sheet 720 is disposed between and the major surface (e.g., 763) of the at least one battery cell (e.g., the plurality of battery cells 760) and the plurality of channels. In some embodiments, the heat exchanger is disposed to transport heat between at least one battery cell (e.g., battery cell 761 or the plurality of battery cells 760) and the fluid through the polymeric sheet. In some such embodiments, the polymeric sheet is disposed such that during operation of the battery cell(s), heat is conducted from the battery cell(s) through the polymeric sheet to the fluid in the plurality of channels and, typically, the battery system is configured to provide fluid flow through the channels so that the fluid proximate the battery cell remains cooler than the battery cell. In some embodiments, for at least some operating modes (e.g., an operating mode where it is desired to cool the batter cell(s)), the heat exchanger is adapted to conduct heat from at least one battery cell (e.g., battery cell 761 or the plurality of battery cells 760) to the fluid through the polymeric sheet. The battery system may have other operating modes (e.g., for cold starting) where the heat exchanger is adapted to conduct heat to at least one battery cell (e.g., battery cell 761 or the plurality of battery cells 760) from the fluid through the polymeric sheet.

In some embodiments, a battery system 2000 includes at least one (or at least two, or at least 4, or at least 10, for example, and up to tens of thousands or 100,000, for example) battery cells 760, and a heat exchanger 700 including a plurality of channels 710 extending generally along a first direction (z-direction) and arranged along an orthogonal second direction (x-direction), where a polymeric sheet 720 extending along the first and second directions includes at least a portion of a major surface of the plurality of channels 710 as described elsewhere herein.

In some embodiments, a heat exchanger is disposed between adjacent battery cells. FIG. 8 is a schematic side view of a portion of a battery system 3000 including a heat exchanger 800 which includes a plurality of channels 810 as described elsewhere. The heat exchanger 800 may correspond to any of the heat exchangers of the present description. A first major surface 802 of the heat exchanger 800 is in thermal contact with a major surface of a first battery cell 861 and a opposite second major surface 803 of the heat exchanger 800 is in thermal contact with a major surface of a second battery cell 862. Additional battery cells or pairs of battery cells may be disposed along a length of the heat exchanger 800.

Figure 9:
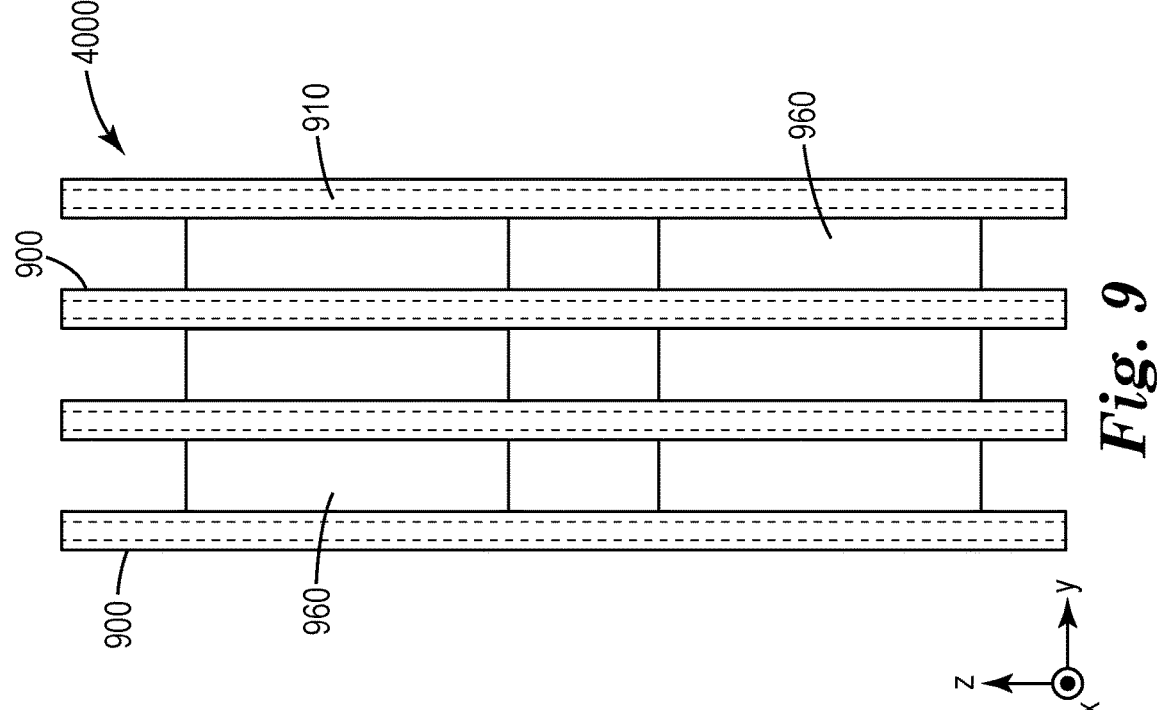

In some embodiments, a plurality of heat exchangers is included in a battery system. FIG. 9 is a schematic side view of a portion of a battery system 4000 including a plurality of heat exchangers 900, each of which includes a plurality of channels 910 and may correspond to any of the heat exchangers of the present description. Alternatively, the collection of heat exchangers 900 may be referred to as a heat exchanger for the battery system 4000. The battery system 4000 includes a plurality of battery cells 960 where each battery cell is in thermal contact with at least one of the heat exchangers 900.

In some embodiments, the heat exchanger is flexible so that it can conform to shapes (e.g., curved or nonplanar shapes) of major surfaces of battery cells. For example, the battery cells may be cylindrical cells as schematically illustrated in FIG. 10.

Figure 10:
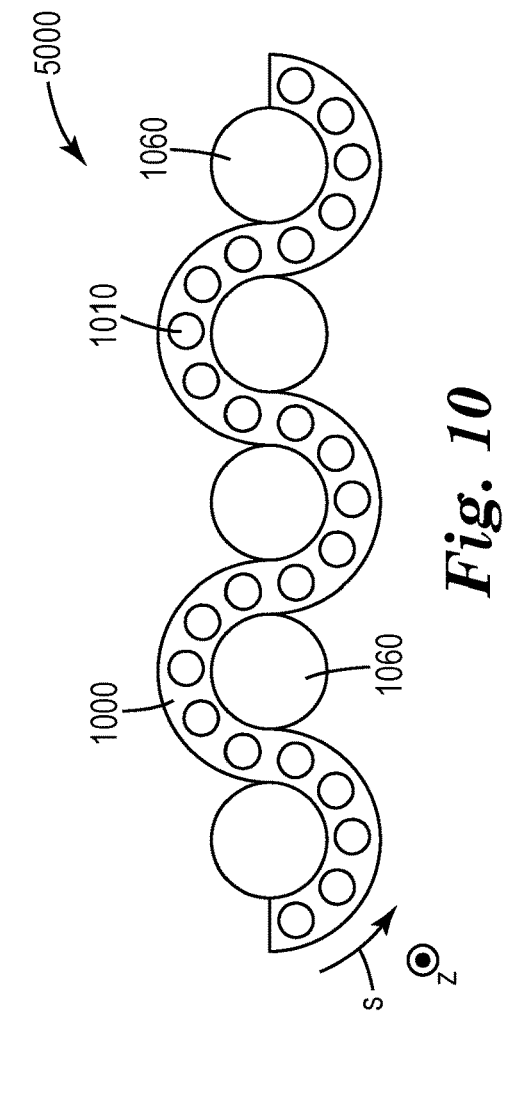
FIG. 10 is a schematic end view of a portion of a battery system.

FIG. 10 is a schematic end view of a portion of a battery system 5000 including a plurality of battery cells 1060 extending generally in a first direction (z-direction) and a heat exchanger 1000 where one of the major surfaces of the heat exchanger 1000 is in thermal contact with the major surface of each of the battery cells 1060. The battery cells 1060 may be spaced apart differently (e.g., larger spacing) than schematically illustrated in FIG. 10. The heat exchanger 1000 includes a plurality of channels 1010 extending generally along the first direction and arranged along an orthogonal second direction (s-direction). The heat exchanger 1000 may be initially substantially planar and then bent to substantially conform to the battery cells 1060. In some embodiments, the battery cells 1060 have a radius of less than 5 cm, or less 3 cm, or less than 1 cm. In some embodiments, the heat exchanger 1000 is sufficiently flexible that it can be bent to a radius of curvature of 5 cm without breaking. In some embodiments, the heat exchanger 1000 is sufficiently flexible that it can be bent to a radius of curvature of less than 5 cm, or less 3 cm, or less than 1 cm without breaking.

Conventional battery systems often use a metal (typically aluminum) heat exchanger at a bottom surface of a battery cell. For example, 7 cm tall, 8 cm wide, and 2 cm thick battery cells may be disposed on an aluminum heat exchanger with the 8 cm by 2 cm bottom surfaces adjacent the heat exchanger. Thermal modeling results of such a battery cell and heat exchanger where the battery cell was modeled as producing 7.84 Watts of heat and the heat exchanger included 5 mm diameter channels with an 8 mm channel to channel spacing in an 8 cm wide aluminum layer showed that the maximum housing temperature was 24.6° C. and the maximum internal battery temperature was 24.7° C. when the temperature of the fluid in the channels was taken to be 15° C. Thermal modeling under the same modeling assumptions was carried out but with a polymeric heat exchanger modeled as having a continuous wide fluid flow channel and a specified thickness of polymer material between the battery cell and the fluid. The polymeric heat exchanger was modeled as HDPE. When the polymer was 0.1 mm thick, the maximum housing temperature was 25.9° C. and the maximum internal battery temperature was 25.9° C. When the polymer was 1.5 mm thick and the fluid temperature was lowered to 10° C., the maximum housing temperature was 33° C. and the maximum internal battery temperature was 33.1° C. When two battery cells were modeled, and the heat exchanger was modeled as having 0.1 mm thick HDPE layers adjacent the major surfaces (7 cm by 8 cm surfaces) of the battery cells and an 0.8 mm thick fluid channel between these major surface, the maximum housing temperature was 15.7° C. and the maximum internal battery temperature was 16.1° C. when a cooling fluid at 15° C. was used. The modeling results indicate that when a polymeric heat exchanger is placed adjacent major surfaces of battery cell(s) instead of using a metal heat exchanger at the bottom surfaces of the battery cell(s), that the same or better degree of cooling can be obtained. This allows for the use of higher temperatures and/or lower flow rates of the cooling fluid while maintaining the temperature of the battery below a desired maximum temperature limit (e.g., a maximum housing temperature of no more than 35° C.).

The following is a list of illustrative embodiments of the present description.

A first embodiment is a battery system comprising: a plurality of battery cells; and a heat exchanger comprising a plurality of channels for transporting fluid, the plurality of channels extending generally along a first direction and arranged along an orthogonal second direction, each channel in the plurality of channels having a major surface disposed to contact the fluid, wherein an integrally formed polymeric sheet extending along the first and second directions comprises at least a portion of the major surface of each channel in the plurality of channels, a major surface of the heat exchanger in thermal contact with a major surface of the plurality of battery cells.

A second embodiment is the battery system of the first embodiment, wherein the battery system provides fluid flow through the plurality of channels such that a temperature of a first battery cell in the plurality of battery cells increasing above a predetermined temperature results in a rupturing of the plurality of channels, the rupturing of the plurality of channels increasing a rate of heat extraction from the first battery cell.

A third embodiment is the battery system of the second embodiment, wherein the predetermined temperature is in a range of 100° C. to 200° C.

A fourth embodiment is the battery system of the second or third embodiments, wherein the rupturing of the plurality of channels comprises a rupturing of the integrally formed polymeric sheet.

A fifth embodiment is the battery system of any one of the first through fourth embodiments, wherein the integrally formed polymeric sheet is one or more of an extruded sheet, a molded sheet, or a unitary sheet.

A sixth embodiment is the battery system of any one of the first through fifth embodiments, wherein the integrally formed polymeric sheet comprises the plurality of channels.

A seventh embodiment is the battery system of any one of the first through fifth embodiments, wherein the plurality of channels is defined between the integrally formed polymeric sheet and an additional layer.

An eighth embodiment is the battery system of the seventh embodiment, wherein the additional layer and the integrally formed polymeric sheet have different compositions.

A ninth embodiment is the battery system of any one of the first through sixth embodiments, wherein the integrally formed polymeric sheet comprises a plurality of tube portions joined together through intermediate portions, each tube portion comprising a channel in the plurality of channels, the tube portions and intermediate portions having different compositions.

A tenth embodiment is a battery system comprising: at least one battery cell; and a heat exchanger comprising a plurality of channels extending generally along a first direction and arranged along an orthogonal second direction, wherein a polymeric sheet extending along the first and second directions comprises at least a portion of a major surface of the plurality of channels, a major surface of the heat exchanger in thermal contact with a major surface of the at least one battery cell, wherein the battery system provides fluid flow through the plurality of channels such that a temperature of a first battery cell in the at least one battery cell increasing above a predetermined temperature results in a rupturing of the plurality of channels, the rupturing of the plurality of channels increasing a rate of heat extraction from the first battery cell.

An eleventh embodiment, is a heat exchanger comprising a plurality of channels for transporting fluid, the plurality of channels extending generally along a first direction and arranged along an orthogonal second direction, each channel in the plurality of channels having a major surface disposed to contact the fluid, wherein a polymeric sheet extending along the first and second directions comprises at least a portion of the major surface of each channel in the plurality of channels, the polymeric sheet comprising at least one feature such that the plurality of channels is configured to rupture at, or proximate to, the at least one feature upon the heat exchanger satisfying a predetermined condition.

A twelfth embodiment is the heat exchanger of the eleventh embodiment, wherein the predetermined condition comprises a temperature of the polymeric sheet exceeding a predetermined temperature.

A thirteenth embodiment is the heat exchanger of the eleventh or twelfth embodiments, wherein the predetermined condition comprises a pressure in the plurality of channels exceeding a predetermined pressure.

A fourteenth embodiment is the heat exchanger of any one of the eleventh through thirteenth embodiments, wherein the at least one feature comprises at least one region where a minimum wall thickness of the plurality of channels is less than an average minimum wall thickness of the plurality of channels.

A fifteenth embodiment is a battery system comprising the heat exchanger of any one of the eleventh through fourteenth embodiments and a battery cell having a major surface in thermal contact with a major surface of the heat exchanger, at least a portion of the polymeric sheet being disposed between the battery cell and the plurality of channels, the battery system providing fluid flow through the plurality of channels such that upon the heat exchanger satisfying the predetermined condition, the rupturing of the plurality of channels at, or proximate to, the at least one feature increases a rate of heat extraction from the battery cell.

EXAMPLES

A polymeric tubing sample, as generally depicted in FIG. 4A, was prepared by extruding polyethylene (obtained under the trade designation "Elite 5230" from Dow Chemical, Midland, MI) through a die. The tubing had a total thickness of 1.5 mm, a channel wall thickness of 0.13 mm, and a center-to-center spacing between channels of 2.4 mm. Further details on the polymeric tubing can be found in Example 1 of U.S. Prov. Pat. Appl. No. 62/885,523 filed on Aug. 12, 2019 and titled "WEBS".

A 30 mm wide slot was cut in the bottom of an aluminum tray, and a 30 mm wide 190 mm length of the polymeric tubing with connected spacers was inserted in the bottom of the tray. The tubing was inserted so 15 mm of tubing protruded in the Al tray. A bead of hot glue using a Stanley GR90C Glue Gun was applied around the tubing bonding it to the aluminum tray base. Then a bead of DP100 Epoxy Adhesive, Dual-Cartridge, 6.76 oz., Clear (3M Company, St. Paul, MN) was applied around the tubing to ensure hermetic sealing. Next, the exposed ends of the tubing opposite the tubing ends bonded in the tray, were sealed with hot glue using the glue gun. Hermeticity was check by pouring water into the tray covering the exposed ends of the tubing. No water seeped into the tubing, confirming the tubing ends were hermetically sealed.

The tray was then placed on a stand above another Al tray that was on a hot plate (Thermoscientific Cimarec Model SP131325). A crescent wrench was placed on top of the Al tray to ensure good thermal contact to the hot plate. A weight was then placed on the tubing to hold it to the bottom of the AL tray on the hot plate, and a 50/50 mixture of water and NAPA extended life antifreeze and coolant was poured over the film, covering the film. A thermocouple was placed in the tray and placed next to the film and under the coolant. A J-Kem Scientific Gemini-Z reader was used to record the temperature.

Next the coolant mixture was poured in the elevated tray, covering the tubing ends with coolant mixture so that the coolant was 165 mm above the tray on the hot plate. No coolant entered the exposed tubing ends. The hot plate was then set to 235° C. and the temperature of the coolant in the bottom tray was observed. When the temperature of the coolant in the bottom tray reached 121.4° C., the hot glue on the ends of the tubing ruptured and coolant from the elevated tray began to flow into the tray on the hot plate. Immediately the temperature of the coolant in the tray on the hot plate began to drop, and coolant could be seen flowing into the lower tray. The experiment was stopped, and the tubing was examined. No noticeable deformation of the tubing was observed, and the hot glue had flowed and unsealed the tubing ends, causing a coolant rupture and subsequent cooling.

A polymeric sheet, as generally described for polymeric sheet 220 or 320, is formed by extruding polyethylene (obtained under the trade designation "Elite 5230" from Dow Chemical, Midland, MI) through a die. Hot glue from the Stanley GR90C Glue Gun is spread into a layer on a release liner, the polymeric sheet is bonded to the layer of hot glue, and the release liner is removed after the glue cools to form a heat exchanger as generally described for heat exchanger 200 or 300 with the layer of glue corresponding to the additional layer 240 or 340. Alternatively, the additional layer can be coextruded along with the polymeric sheet. The heat exchanger is then placed adjacent to, and in thermal contact with, at least one battery cell with the additional layer of the heat exchanger facing the battery cell(s). A coolant fluid is provided though the plurality of channels in the resulting battery system (Prophetic Example 1). A temperature of a battery cell increasing above a temperature of about 120° C. results in a rupturing of the channels which provides an increased rate of heat extraction from the battery cell due to coolant fluid flowing through the ruptured channels to the battery cell.

All references, patents, and patent applications referenced in the foregoing are hereby incorporated herein by reference in their entirety in a consistent manner. In the event of inconsistencies or contradictions between portions of the incorporated references and this application, the information in the preceding description shall control.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. A battery system comprising:
   a plurality of battery cells; and
   a heat exchanger comprising a plurality of channels for transporting fluid, the plurality of channels extending generally along a first direction and arranged along an orthogonal second direction, each channel in the plurality of channels having a major surface disposed to contact the fluid, wherein an integrally formed polymeric sheet extending along the first and second directions comprises at least a portion of the major surface of each channel in the plurality of channels, the at least a portion of the major surface of each channel extending along an entire length of the channel along the first direction, a major surface of the heat exchanger in thermal contact with a major surface of the plurality of battery cells.

2. The battery system of claim 1, wherein the battery system provides fluid flow through the plurality of channels such that a temperature of a first battery cell in the plurality of battery cells increasing above a predetermined temperature results in a rupturing of the plurality of channels, the rupturing of the plurality of channels increasing a rate of heat extraction from the first battery cell.

3. The battery system of claim 2, wherein the predetermined temperature is in a range of 100° C. to 200° C.

4. The battery system of claim 2, wherein the rupturing of the plurality of channels comprises a rupturing of the integrally formed polymeric sheet.

5. The battery system of claim 1, wherein the integrally formed polymeric sheet is one or more of an extruded sheet, a molded sheet, or a unitary sheet.

6. The battery system of claim 1, wherein the integrally formed polymeric sheet comprises the plurality of channels.

7. The battery system of claim 1, wherein the plurality of channels is defined between the integrally formed polymeric sheet and an additional layer.

8. The battery system of claim 7, wherein the additional layer and the integrally formed polymeric sheet have different compositions.

9. The battery system of claim 1, wherein the integrally formed polymeric sheet comprises a plurality of tube portions joined together through intermediate portions, each tube portion comprising a channel in the plurality of channels, the tube portions and intermediate portions having different compositions.

10. A battery system comprising:
    at least one battery cell; and
    a heat exchanger comprising a plurality of channels extending generally along a first direction and arranged along an orthogonal second direction, wherein an integrally formed polymeric sheet extending along the first and second directions comprises at least a portion of a major surface of each channel of the plurality of channels, the at least a portion of the major surface of each channel extending along an entire length of the channel along the first direction, a major surface of the heat exchanger in thermal contact with a major surface of the at least one battery cell, wherein the battery system provides fluid flow through the plurality of channels such that a temperature of a first battery cell in the at least one battery cell increasing above a predetermined temperature results in a rupturing of the plurality of channels, the rupturing of the plurality of channels increasing a rate of heat extraction from the first battery cell.

11. A heat exchanger comprising a plurality of channels for transporting fluid, the plurality of channels extending generally along a first direction and arranged along an orthogonal second direction, each channel in the plurality of channels having a major surface disposed to contact the fluid, wherein an integrally formed polymeric sheet extending along the first and second directions comprises at least a portion of the major surface of each channel in the plurality of channels, the at least a portion of the major surface of each channel extending along an entire length of the channel along the first direction, the polymeric sheet comprising at least one feature such that the plurality of channels is configured to rupture at, or proximate to, the at least one feature upon the heat exchanger satisfying a predetermined condition.

12. The heat exchanger of claim 11, wherein the predetermined condition comprises a temperature of the polymeric sheet exceeding a predetermined temperature.

13. The heat exchanger of claim 11, wherein the predetermined condition comprises a pressure in the plurality of channels exceeding a predetermined pressure.

14. The heat exchanger of claim 11, wherein the at least one feature comprises at least one region where a minimum wall thickness of the plurality of channels is less than an average minimum wall thickness of the plurality of channels.

15. A battery system comprising the heat exchanger of claim 11 and a battery cell having a major surface in thermal contact with a major surface of the heat exchanger, at least a portion of the polymeric sheet being disposed between the battery cell and the plurality of channels, the battery system providing fluid flow through the plurality of channels such that upon the heat exchanger satisfying the predetermined condition, the rupturing of the plurality of channels at, or proximate to, the at least one feature increases a rate of heat extraction from the battery cell.

16. A battery system comprising the heat exchanger of claim 11 and a plurality of battery cells, a major surface of the heat exchanger contacting a major surface of the plurality of battery cells, at least a portion of the polymeric sheet being disposed between the major surface of the plurality of battery cells and the plurality of channels, the battery system providing fluid flow through the plurality of channels such that upon the heat exchanger satisfying the predetermined condition at a location adjacent a first battery cell in the plurality of battery cells, the rupturing of the plurality of channels at, or proximate to, the at least one feature increases a rate of heat extraction from the first battery cell.

17. The battery system of claim 10, wherein the at least one battery cell comprises a plurality of battery cells.

* * * * *